United States Patent [19]

Lubsen et al.

[11] 3,713,842

[45] Jan. 30, 1973

[54] AGGLOMERATION OF ROAST AND GROUND COFFEE WITH INSTANT COFFEE SOLUBLES

[75] Inventors: Timothy A. Lubsen, Cincinnati; Frederick M. Joffe, Wyoming; Paulee Gregory, Forest Park; Joseph R. McSwiggin, Cinncinnati, all of Ohio

[73] Assignee: The Proctor & Gamble Company, Cincinnati, Ohio

[22] Filed: Dec. 10, 1970

[21] Appl. No.: 96,821

[52] U.S. Cl. ..........................99/65, 99/68, 99/71, 99/DIG. 4
[51] Int. Cl. ...............................................A23s 1/04
[58] Field of Search....99/DIG. 4, 71, 68, 65; 23/313; 264/117

[56] References Cited

UNITED STATES PATENTS

| 3,615,669 | 10/1971 | Hair et al. | 99/71 |
| 1,641,446 | 9/1927 | McColl | 99/66 |
| 1,239,221 | 9/1917 | Rodman | 264/117 |
| 1,951,357 | 3/1934 | Hall | 99/66 |

FOREIGN PATENTS OR APPLICATIONS

| 742,150 | 12/1955 | Great Britain | 99/DIG. 4 |

Primary Examiner—Tim R. Miles
Assistant Examiner—William L. Mentlik
Attorney—Edmund J. Sease and Richard C. Witte

[57] ABSTRACT

A method of pan agglomerating roast and ground coffee using instant coffee extract as an agglomerating agent. The method yields a product which is approximately 25 percent lower in tamped bulk density than roast and ground coffee and yet equal in brew flavor strength to conventional roast and ground coffee.

12 Claims, 2 Drawing Figures

Timothy A. Lubsen
Frederick M. Joffe
Paul E. Gregory
Joseph R. McSwiggin
INVENTORS BY Edmund P. Sease

ATTORNEY

AGGLOMERATION OF ROAST AND GROUND COFFEE WITH INSTANT COFFEE SOLUBLES

BACKGROUND OF THE INVENTION

As used herein, the term "conventional roast and ground coffee particles" refers to the product familiar to all presently available on the market. It comprises roast coffee beans which have been ground to form random irregularly shaped cube-like particles.

Traditionally, roast and ground coffee has only existed in the conventional form, and little or no scientific effort has been applied in regard to producing different appearance roast and ground coffee products. For an example of a process which comprises changing the physical form of conventional roast and ground coffee particles, see Mahlmann, Canadian Pat. No. 808,588. which relates to compressing roast and ground coffee into a doughnut-shaped ring suitable for encapsulation in a water-permeable packet to provide a convenient, easily disposable product.

Of course, changing the appearance of conventional roast and ground coffee particles also has other effects on the product such as a change in bulk density[1]. The term "bulk density" refers to the overall density of a plurality of particles measured after vibratory settlement in a manner such as that described on pages 130, 131 of Coffee Processing Technology, Avi Publishing Company, Westport, Conn., 1963, Vol. II. Changes in product bulk density must be carefully considered in regard to the effect they may have on consumer measurement habits. For example, conventional roast and ground coffee has a bulk density of approximately 0.45 g/cc, and usually requires about 7.2 grams of coffee per cup; whereas a product having a higher bulk density, i.e., 0.60 g/cc, would require a one-fourth smaller volume measurement to deliver 7.2 grams/cup and thus provide a cup of beverage of equivalent strength. Consumers used to the familiar one spoon per cup measurement might find such adjustments in measurement difficult to cope with.

Ideally, any change in roast and ground coffee appearance should also be coupled with a decrease in bulk density and yet allow for equivalent measurement techniques. In other words, the product should have a pleasing appearance, the bulk density should be decreased, and yet the familiar spoon measurement should provide one cup of brew of a strength equal to that provided by a spoonful of roast and ground coffee.

While mixtures of roast and ground coffee and instant coffee have heretofore been known, for example, see U.S. Pat. No. 3,120,439, it has not heretofore been known that a product comprising agglomerated roast and ground coffee, wherein the agglomerating agent is instant coffee extract, can be prepared which provides a 12.5–33 percent decrease in bulk density and yet equivalent measurements of the agglomerated product and conventional roast and ground coffee yield a brew of equivalent strength.

It is an object of the invention to provide a unique appearance roast and ground coffee product which has a bulk density of from 12.5–33 percent less than the bulk density of conventional roast and ground coffee particles and yet which for any given unit of measurement will provide a brew of equal strength to a brew prepared from conventional roast and ground coffee particles.

An additional object of this invention is to provide a method for preparing a unique appearance agglomerated roast and ground coffee product wherein agglomeration is accomplished by utilizing instant coffee extract as the agglomerating fluid or agent, the two terms being used herein interchangeably.

These and other objects will become apparent from the following description of the invention.

SUMMARY OF THE INVENTION

This invention relates to unique appearance pan agglomerated roast and ground coffee wherein the agglomerating fluid is instant coffee extract. Compared to the bulk density of roast and ground coffee, the agglomerated product of this invention has a 12.5–33 percent decrease in bulk density and is from about 12.5 to 38 percent stronger in flavor than conventional roast and ground coffee on a weight basis.

REFERENCE TO DRAWINGS

DETAILED DESCRIPTION OF THE INVENTION

Figure 1:
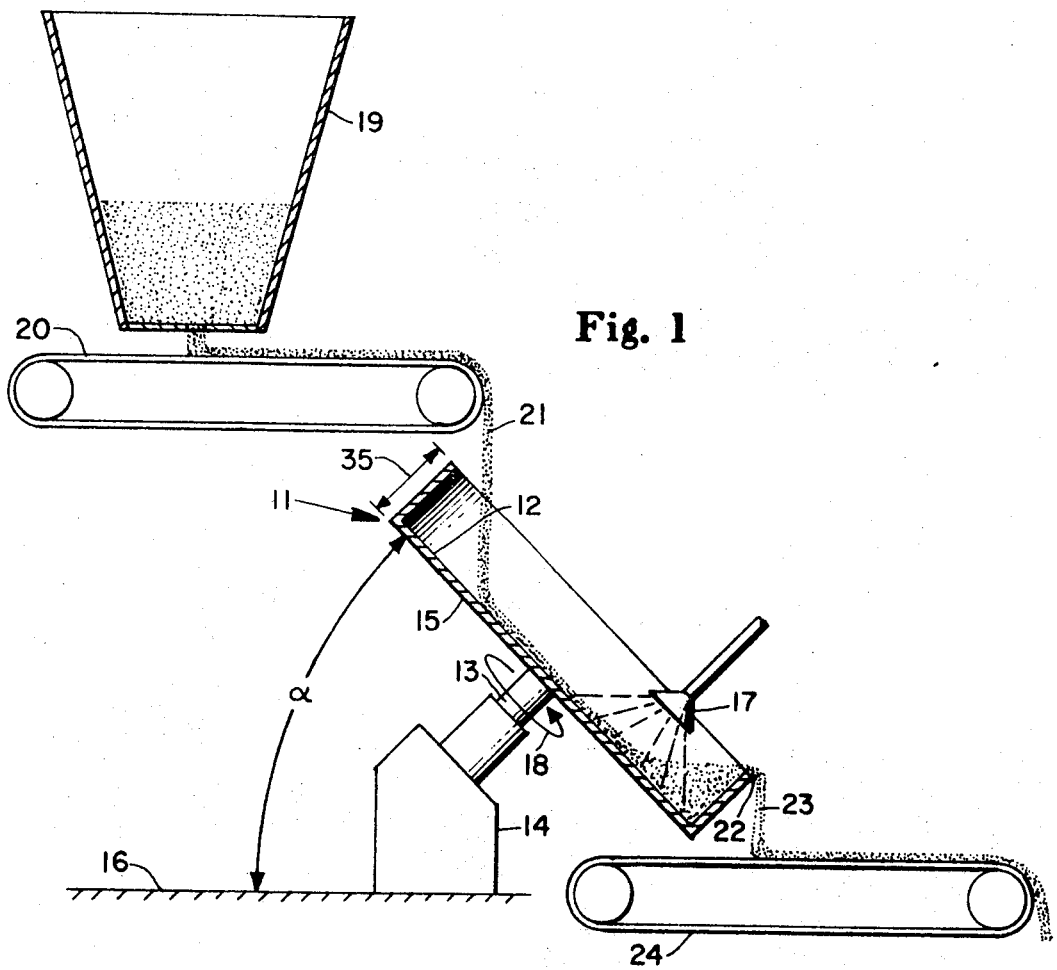
FIG. 1 shows a schematic representation of a preferred method of carrying out the pan agglomerating process of this invention.

The process of this invention comprises pan agglomerating of roast and ground coffee utilizing instant coffee extract as the agglomerating fluid.

Pan agglomerating as used herein refers to a process wherein the material to be agglomerated is placed in the upper portion of an inclined circular rotating pan and is allowed to tumble and simultaneously gravity feed towards the bottom of the pan; the material is in constant circular motion because of the revolving pan surface. Towards the bottom portion of the pan, agglomerating fluid is sprayed onto the tumbling and rotating material in order to form sites for agglomeration during subsequent rotations. Ultimately agglomerated product is discharged from the lower edge of the pan. A more complete description of pan agglomerating will be given in the context of the invention, and while describing the drawings. For further details in regard to pan agglomerating materials such as ore and other materials, see U.S. Pat. No. 1,239,221.

Turning now to a specific description of the pan agglomerating process of this invention, which will be given in connection with FIG. 1.

The pan agglomerator 11 comprises a shallow rotating circular pan 12 mounted on a shaft 13 which is connected to rotary means (not shown) and mounted on stationary platform 14. The bottom 15 of rotary pan 12 forms an angle, $\alpha$, with respect to the horizontal plane 16. Spray nozzle 17 is mounted above rotary pan 12 to allow spraying of instant coffee extract agglomerating fluid onto roast and ground coffee particles contained in rotary pan 12. Directional arrow 18 shows the direction of rotation of rotary pan 12. During operation rotary pan 12 revolves in a fashion similar to that of an ordinary cement mixer.

In actual operation of the process of this invention, roast and ground coffee is metered from hopper 19 onto endless conveyor belt 20 from which it is metered at a predetermined rate into an upper portion of rotary pan 12 as indicated by flow path 21. If desired, endless conveyor belt 20 need not be employed, and roast and ground coffee from hopper 19 can be metered directly into the upper portion of rotary pan 12.

During operation, rotary pan 12 is continuously rotated by rotary means at a predetermined rate as measured in revolutions per minute. Because rotary pan 12 is mounted on an inclined angle, $\alpha$, the roast and ground coffee which has been metered into the upper portion of rotary pan 12 has a tendency to gravity feed to the edge 22 of rotary pan 12 which is nearest the horizontal. In addition, the rotation of rotary pan 12 exerts a centrifugal force upon the roast and ground coffee which has a tendency to thrust the coffee towards the outer peripheries of rotary pan 12. Thus, a definite force relationship exists which comprises a simultaneous exertion of the natural force of gravity as well as a centrifugal force created by the rotation of rotary pan 12. This force relationship will be explained in more detail hereinafter in connection with FIG. 2.

Simultaneously with subjection to the heretofore mentioned force relationship, instant coffee extract is sprayed from spray nozzle 17 at a predetermined rate onto the roast and ground coffee. The location of spray nozzle 17, as will be explained hereinafter in more detail in connection with FIG. 2, is generally in a lower quadrant of circular rotary pan 12 opposite the quadrant in which the roast and ground coffee is metered into rotary pan 12.

The droplets of coffee extract spray originating from spray nozzle 17 hit the roast and ground coffee particles contained in rotary pan 12 and form a site for agglomeration, i.e., a point where other dry solids may adhere. During the tumbling action which is effected in rotary pan 12 and because of the force relationship set up in rotary pan 12, agglomerates gradually build up around the previously mentioned sites and, after these agglomerates reach a designated size, they spill over the lower edge 22 of rotary pan 12 in a manner shown by flow path 23 and can be collected for subsequent packaging and use. One convenient means of collection is a second endless conveyor belt 24.

Figure 2:
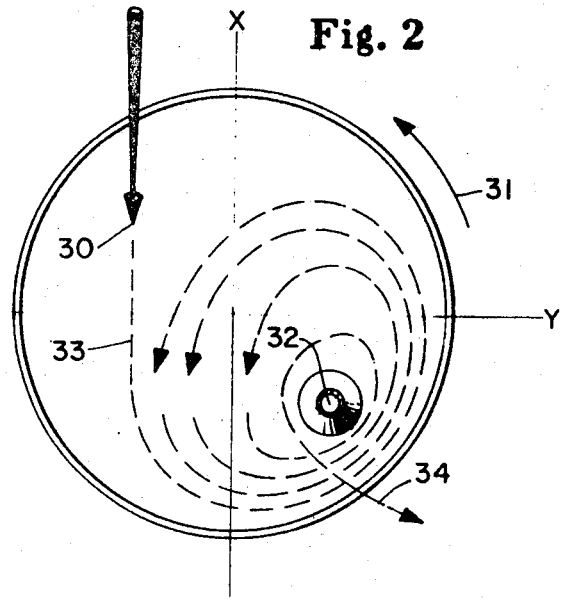
FIG. 2 shows a plan view of a pan agglomerator with arrows representing the rotational movement of the pan and the flow of the roast and ground coffee through the pan agglomerator, and with points representing the site of the instant coffee spray and the site of the roast and ground coffee feed.

Turning now to FIG. 2 which is a plan view of rotary pan 12 of FIG. 1, and which more clearly shows the force relationship created within rotary pan 12 of FIG. 1. For purposes of clarity and description, rotary pan 12 of FIG. 1 is shown in FIG. 2 as divided into four quadrants by lines X and Y. Point 30 located in the upper left quadrant of rotary pan 12 designates the point at which roast and ground coffee is fed into the rotary pan 12. Directional arrow 31 indicates the direction of rotation of the rotary pan 12. Point 32 located in the lower right quadrant of rotary pan 12 indicates the position of spray nozzle 17 of FIG. 1. Assuming that the rotary pan 12 as shown in FIG. 1 is mounted on the inclined angle $\alpha$ of FIG. 1, point 30 of FIG. 2, i.e., where roast and ground coffee is metered into rotary pan 12, is in the upper portion of rotary pan 12, and spray nozzle 17 of FIG. 1, as indicated by point 32 of FIG. 2, is in the lower portion of rotary pan 12 nearest the edge from which discharge as shown by directional arrow 34 occurs.

Turning now to a description of the force relationship set up in rotary pan 12, the roast and ground coffee which is metered in at point 30 because of the natural action of gravity tends to slide toward the lower quadrants of rotary pan 12 in a manner shown by dotted line 33. Because rotary pan 12 is rotating at a predetermined speed, the roast and round coffee particles are subjected to centrifugal force and move to the outer edge of rotary pan 12 and are carried in a manner shown by dotted line 33 along the peripheral wall as the pan starts rotation into the upper quadrants of rotary pan 12. As the roast and ground coffee particles move in an upwards manner, gradually the effect of gravity causes them to fall in a manner indicated by dotted line 33 towards the lower quadrants of rotary pan 12. This action continues in the manner shown by dotted line 33 such that the overall effect is to create a vortex in the lower quadrant of rotary pan 12 nearest the point 32 at which spraying of instant coffee agglomerating fluid occurs.

After spraying of instant coffee extract agglomerating fluid has occurred, there is a formation of a "site" at which other roast and ground coffee particles may aggregate and form larger agglomerated particles. These heavier particles being more affected by gravity travel to lower elevations within the upper quadrants, in a manner shown by dotted line 33, and gradually are naturally classified by the force relationship such that the larger agglomerated particles work themselves to the top of the quantity of roast and ground coffee contained in rotary pan 12 and after reaching a specific size are discharged as indicated by directional arrow 34.

In order to produce unique appearance agglomerated roast and ground coffee, which has a bulk density of from 12.5 to 33 percent less than the bulk density of roast and ground coffee (about 0.45 g/cc), utilizing instant coffee extract as the agglomerating fluid, it has been found essential to carefully control certain process variables when utilizing the previously described pan agglomeration method. These process variable are the rotary pan 12 height-diameter ratio, the inclined angle $\alpha$ of rotary pan 12 with respect to the horizontal plane 16, the extract concentration of the instant coffee extract agglomerating fluid, the speed of revolution of rotary pan 12, and the ratio of roast and ground feed rate to extract spray rate. Controlling each of these variables within the ranges set forth hereinafter insures preparation of an agglomerated product which comprises from about 1 percent to about 15 percent instant coffee on a dry weight basis, and most preferably, from about 5 percent to abut 10 percent instant coffee on a dry weight basis. When the product comprises an amount of instant coffee within these prescribed ranges, the product will have a bulk density of from about 0.30 g/cc to about 0.35 g/cc, which is from about 12.5 percent to about 33 percent reduction in bulk density in comparison with roast and ground coffee, and still the product will prepare for equivalent units of volume measurement a brew of a strength equal to that of roast and ground coffee. Putting it another way, because of the lower bulk density but equal brew strength from 4.5 to 5.0 grams of the agglomerated product of this invention will provide a cup of coffee having a brew strength equal to a cup of coffee produced from 7.2 grams of conventional roast and ground coffee particles.

Turning now to the specific process variables which heretofore have been mentioned as essential to control, and in particular, turning to the pan height-diameter ratio. As used herein, the term "pan height-diameter ratio" is intended to mean the ratio of the rotary pan 12 height, shown as 35 on FIG. 1, to the diameter of rotary pan 12. In order to produce agglomerated roast and ground coffee which has the requisite decreased bulk density and desired appearance when compared to roast and ground coffee particles, it is essential that the rotary pan height diameter ratio be within the range of from 0.10 to 0.20, and preferably within the range of from 0.13 to 0.17. Utilizing ratios within this prescribed range is essential because, for example, for a fixed diameter where the rotary pan height 35 is too low, the residence time within the rotary pan agglomerator will be too short and the circular travel pattern shown most clearly in FIG. 2 will be of insufficient time length to provide good particle agglomeration. On the other hand, if the rotary pan height is too high, i.e., the height-diameter ratio is grater than 0.2, the residence time within rotary pan 12 will be too long and instead of forming irregularly shaped agglomerated particles with desireable appearance, the particles will agglomerate into compact balls or pellets having an undesirable appearance.

A second essential feature which must be carefully controlled in order to insure formation of the product having the desired lowered bulk density, is the included angle $\alpha$ between the bottom 15 of rotary pan 12 and the horizontal plane 16. As one can readily see from examining FIG. 1, the angle of elevation of rotary pan 12 determines to some extent, at least, the speed with which the roast and ground conventional particles gravity feed from the upper portion of rotary pan 12 to the bottom portion of rotary pan 12. If the angle is too great, i.e., greater than about 60°, the roast and ground coffee will tend to rapidly move to the bottom of rotary pan 12 nearest lower edge 22 and rapidly move out of the pan with little or none of the desired rotational movement previously described in connection with the dynamic force relationships shown in FIG. 2. On the other hand, if the angle is too low, i.e., less than 40°, the residence time within rotary pan 12 will be increased and the particles will be subjected to the previously described force relationship for longer periods of time, and rather than irregular shaped desirable agglomerated particles, the product will appear as compact balls or pellets which of course represent an undesirable appearance. A preferred angle, $\alpha$, is from 45° to 50°.

The third essential process variable is the concentration the instant coffee extract agglomerating fluid. The concentration of the instant coffee extract should be within the range of from 40 to 70 percent solubles. If the extract has less than 40 percent solubles it has insufficient adhesive properties to form agglomerating sites on the roast and ground coffee particles, and accordingly the result is a coating effect rather than agglomeration. On the other hand, if the instant coffee extract has a solubles concentration greater than 70 percent, spraying becomes extremely difficult. Preferably, the instant coffee extract concentration is from 55 to 65 percent solubles.

A fourth factor is the number of revolutions per minute that rotary pan 12 makes. Generally, satisfactory speeds are within the range of from 5 rpm to 50 rpm, with a preferred range of from 15 rpm to 30 rpm. At speeds slower than 5 rpm, there is an insufficient force relationship to provide the necessary flow as shown in FIG. 2. On the other hand, at speeds in excess of 50 rpm, the roast and ground coffee is merely thrown out of rotary pan 12 by an excessive amount of centrifugal force. The preferred range of from 15 rpm to 30 rpm is a practical one.

Control of each of the above described process variables within their ranges will control the residence time of the roast and ground coffee particles within rotary pan 12. Generally, it has been found that satisfactory residence times are within the range of from 1 minute to 15 minutes, and preferably from 3 minutes to 8 minutes in order to provide a satisfactory agglomerated product of lowered bulk density and yet of equal brew strength.

The product discharged at the point shown by directional arrow 23 comprises wet agglomerates and prior to packaging must be dried by conventional drying means such as fluidized bed drying at temperatures of from 120° to 200° F., and preferably at temperatures within the range of from 140° to 160° F. No criticality exists with spoon to the specific drying means employed, and other dryers such as oven dryers may be employed to give satisfactory results so long as the dryer does not destroy the structural integrity of the particles.

As mentioned previously, conventional roast and ground coffee particles have a bulk density within the range of from 0.40 g/cc to 0.45 g/cc, and a satisfactory cup of coffee beverage of uniform strength is generally made from 7.2 grams of conventional roast and ground coffee per cup. The product of this invention has a bulk density of from 12.5–33 percent less than that of conventional roast and ground coffee particles, i.e., of from 0.30 to 0.35 g/cc, and yet produces, at a level of from 4.5 to 5.0 grams per cup, a cup of coffee beverage of equal brew strength to that produced from conventional roast and ground coffee at a level of 7.2 grams per cup. Thus, the product has a lower bulk density and yet is equal in brew strength to conventional roast and ground coffee.

In order to provide the lowered bulk density and equal brew strength effect, it is essential that the agglomerated product comprise from 1 to 15 percent by weight instant coffee, and preferably from 5 to 10 percent by weight of instant coffee. The amount of instant coffee contained in the ultimate product can be controlled by utilizing the above-described process variables, along with control of the ratio of roast and ground coffee solids feed rate to the instant extract spray feed rate which should be within the range of from 10:1 to 4:1, and preferably within the range of from 8:1 to 5:1.

The following Example is offered to further illustrate the process of this invention.

EXAMPLE

A pan agglomerator in accord with the specific description given in connection with FIG. 1 was set up. The rotary pan 12 dimensions were as follows: inside diameter — 25 inches; pan height — 4 inches; ratio of height to diameter — 0.16. The included angle, $\alpha$, between the pan bottom 15 and the horizontal plane 16 was 45°. Conventional roast and ground coffee particles were fed from hopper 19 onto endless conveyor belt 20 and into the upper portion of rotary pan 12 (at the relative positions shown as point 30 in FIG. 2) at a rate of 46.5 lbs/hour. The roast and ground coffee was regular grind size. Rotary pan 12 was rotated by rotating means not shown in the drawing at a speed of 24 to 25 rpm. Instant coffee extract having a solubles concentration of from 63 to 65 percent was sprayed onto the tumbling and rotating roast and ground coffee at a point shown as point 32 in FIG. 2. The instant coffee extract feed rate was 8.9 pounds/hour and the ratio of roast and ground coffee feed rate to instant coffee rate was 5.2:1. The incoming roast and ground coffee particles fell from point 30 along the flow pattern shown by dotted line 33 on FIG. 2 and followed the vortex pattern shown in FIG. 2, dotted line 33. Agglomerated particles were discharged at the lower edge 22 of rotary pan 12 as shown by directional arrow 34 and flow path 23. The wet agglomerates were dried in a Jeffrey fluidized bed dryer utilizing air inlet temperatures of from 140° to 174° F., and outlet air temperatures of from 100° to 110° F. The residence time in the Jeffrey dryer was estimated at about 45 to 60 seconds, the residence time of the roast and ground particles in pan agglomerator 12 was estimated from 4 to 6 minutes. The product was examined and found to comprise 10.8 percent instant coffee and the remaining portion roast and ground coffee.

The agglomerated product was noted to have an irregular shape and the agglomerates appeared somewhat larger than conventional regular grind roast and ground coffee. When compared with the conventional regular grind roast and ground coffee utilized as the feed material, it was found that the agglomerated product had a bulk density, as measured in accord with the previously described Sivetz reference, of 0.34 grams/ccm, and the feed conventional roast and ground coffee particles had a bulk density of 0.45 g/cc. This represented a decrease in product bulk density of 24.6 percent. In flavor tests performed by an expert panel, it was found that one heaping spoon of roast and ground coffee (9.6 grams) provided a cup of beverage which was found to be equal in flavor strength to a cup of beverage prepared from one heaping spoon (7.5 grams) of the agglomerated product of this invention.

What is claimed is:

1. A method of pan agglomerating roast and ground coffee using coffee extract as the agglomerating agent, said method comprising, placing conventional roast and ground coffee particles in an inclined circular rotating pan, the bottom of said rotary pan forming an angle of from 40° to 60° with respect to the horizontal and said pan rotating at a speed of from 5 rpm to 50 rpm; spraying coffee extract having a solubles concentration of from 40 to 70 percent onto said roast and ground coffee particles whereby said particles of conventional roast and ground coffee aggregate to form agglomerates comprised of from 1 to 15 percent by weight of instant coffee, drying the agglomerates to form a unique appearance agglomerated roast and ground coffee product having a bulk density of from 0.30 g/cc to 0.35 g/cc.

2. The process of claim 1 wherein the pan height-diameter ratio is from 0.13 to 0.17.

3. The process of claim 1 wherein the angle is from 45° to 50°.

4. The process of claim 1 wherein the extract solubles concentration is from 55 to 65 percent.

5. The process of claim 1 wherein the rotary pan is rotating at a speed of from 15 rpm to 30 rpm.

6. The process of claim 1 wherein the agglomerated roast and ground coffee product comprises from 5 to 10 percent by weight of instant coffee.

7. The process of claim 1 wherein the ratio of the roast and ground coffee solids feed rate to the extract spraying feed rate is from 10:1 to 4:1.

8. The process of claim 7 wherein the ratio is from 8:1 to 5:1.

9. The process of claim 1 wherein the residence time in the rotating pan is from 1 minute to 15 minutes.

10. The process of claim 9 wherein the residence time is from 3 minutes to 8 minutes.

11. The process of claim 1 wherein the agglomerates are dried at a temperature of from 120° to 200° F.

12. The process of claim 11 wherein the agglomerates are dried at a temperature of from 140° to 160° F.

* * * * *